US009278868B2

(12) United States Patent
Kamen et al.

(10) Patent No.: US 9,278,868 B2
(45) Date of Patent: *Mar. 8, 2016

(54) LOCALLY POWERED WATER DISTILLATION SYSTEM

(71) Applicant: DEKA Products Limited Partnership, Manchester, NH (US)

(72) Inventors: Dean Kamen, Bedford, NH (US); Jason A. Demers, Manchester, NH (US); Kingston Owens, Bedford, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 33 days.

This patent is subject to a terminal disclaimer.

(21) Appl. No.: 14/025,279

(22) Filed: Sep. 12, 2013

(65) Prior Publication Data

US 2014/0021029 A1 Jan. 23, 2014

Related U.S. Application Data

(60) Continuation of application No. 11/926,680, filed on Oct. 29, 2007, now Pat. No. 8,534,062, which is a division of application No. 10/714,683, filed on Nov. 13, 2003, now Pat. No. 7,340,879.

(Continued)

(51) Int. Cl.
*F01B 29/10* (2006.01)
*C02F 1/02* (2006.01)
(Continued)

(52) U.S. Cl.
CPC .............. *C02F 1/041* (2013.01); *B01D 1/0035* (2013.01); *B01D 1/06* (2013.01); *B01D 1/065* (2013.01);

(Continued)

(58) Field of Classification Search
CPC ............ C02F 1/041; C02F 1/048; C02F 1/16; C02F 2301/08; B01D 3/00; B01D 3/007; B01D 1/2887; B01D 1/065; B01D 3/42; B01D 1/06; B01D 1/2893; B01D 35/12; B01D 1/289; B01D 29/01; B01D 1/28; B01D 5/0015; B01D 1/221; B01D 1/0035; B01D 3/10; F04C 19/002; F04C 29/0085; F04C 19/005; F04C 19/004; F04C 19/008; F04C 2270/86; F28D 7/0066; F28D 9/0093; F28D 9/005
USPC .............................. 60/517–526; 202/152, 163
See application file for complete search history.

(56) References Cited

U.S. PATENT DOCUMENTS 3,390,057 A * 6/1968 Day ............................... 202/172
3,493,468 A * 2/1970 Arcari ........................... 202/160
(Continued)

*Primary Examiner* — Hoang Nguyen
(74) *Attorney, Agent, or Firm* — Michelle Saquet Temple

(57) ABSTRACT

A system for distributed utilities including electrical power and water. A generation device is provided for converting an available resource to a desired utility; the resource may be water, in which case the generator is a purifier for purifying untreated water, or, alternatively, the generator may convert a fuel to electrical power. In either case, an input sensor is provided for measuring input to the generation device, while an output sensor is provided for measuring consumption of output from the generation device. The monitoring system has a controller for concatenating measured input and consumption of output on the basis of the input and output sensors. Measured parameters are telemetered to a remote site where utility generation and use are monitored and may also be controlled. At least a portion of the electrical power capacity of the electric generation unit may power a water purification unit such as a vapor compression distillation unit, and heat output of the electric generation unit may supply heat to the water purification unit.

16 Claims, 7 Drawing Sheets

Related U.S. Application Data

(60) Provisional application No. 60/425,820, filed on Nov. 13, 2002, provisional application No. 60/490,615, filed on Jul. 28, 2003, provisional application No. 60/518,782, filed on Nov. 10, 2003.

(51) Int. Cl.
| | |
|---|---|
| *C02F 1/04* | (2006.01) |
| *B01D 1/00* | (2006.01) |
| *B01D 1/06* | (2006.01) |
| *B01D 1/22* | (2006.01) |
| *B01D 1/28* | (2006.01) |
| *B01D 3/42* | (2006.01) |
| *B01D 5/00* | (2006.01) |
| *B01D 29/01* | (2006.01) |
| *B01D 35/12* | (2006.01) |
| *C02F 1/16* | (2006.01) |
| *F04C 19/00* | (2006.01) |
| *F04C 29/00* | (2006.01) |
| *F28D 7/00* | (2006.01) |
| *F28D 9/00* | (2006.01) |
| *B01D 3/00* | (2006.01) |
| *B01D 3/10* | (2006.01) |

(52) U.S. Cl.
CPC *B01D 1/221* (2013.01); *B01D 1/28* (2013.01); *B01D 1/289* (2013.01); *B01D 1/2887* (2013.01); *B01D 1/2893* (2013.01); *B01D 3/00* (2013.01); *B01D 3/007* (2013.01); *B01D 3/42* (2013.01); *B01D 5/0015* (2013.01); *B01D 29/01* (2013.01); *B01D 35/12* (2013.01); *C02F 1/048* (2013.01); *C02F 1/16* (2013.01); *F04C 19/002* (2013.01); *F04C 19/004* (2013.01); *F04C 19/005* (2013.01); *F04C 19/008* (2013.01); *F04C 29/0085* (2013.01); *F28D 7/0066* (2013.01); *F28D 9/005* (2013.01); *F28D 9/0093* (2013.01); *B01D 3/10* (2013.01); *C02F 2301/08* (2013.01); *F04C 2270/86* (2013.01)

(56) References Cited

U.S. PATENT DOCUMENTS

| | | | | |
|---|---|---|---|---|
| 4,539,076 | A | * | 9/1985 | Swain .................... 202/154 |
| 5,973,481 | A | * | 10/1999 | Thompson et al. ............ 322/7 |
| 6,536,207 | B1 | * | 3/2003 | Kamen et al. ............. 60/39.6 |
| 7,340,879 | B2 | * | 3/2008 | Kamen et al. ............... 60/783 |
| 8,534,062 | B2 | * | 9/2013 | Kamen et al. ............... 60/517 |
| 2002/0135493 | A1 | * | 9/2002 | Moreno et al. .......... 340/870.02 |

* cited by examiner

LOCALLY POWERED WATER DISTILLATION SYSTEM

CROSS REFERENCE TO RELATED APPLICATIONS

This application is a Continuation of U.S. patent application Ser. No. 11/926,680, filed Oct. 29, 2007 and entitled Locally Powered Water Distillation System, now U.S. Pat. No. 8,534,062, issued Sep. 17, 2013, which is a Divisional of U.S. patent application Ser. No. 10/714,683, filed Nov. 13, 2003 and entitled Locally Powered Water Distillation System, now U.S. Pat. No. 7,340,879, issued Mar. 11, 2008, which claims priority from U.S. Provisional Patent Application Ser. No. 60/425,820, filed Nov. 13, 2002 and entitled Pressurized Vapor Cycle Liquid Distillation, U.S. Provisional Patent Application Ser. No. 60/490,615, filed Jul. 28, 2003 and entitled Systems and Methods for Distributed Utilities, and U.S. Provisional Patent Application, Ser. No. 60/518,782, filed Nov. 10, 2003 and entitled Locally Powered Water Distillation System, each of which is hereby incorporated herein by reference in its entirety. U.S. patent application Ser. No. 10/713,617, filed Nov. 13, 2003 and entitled Pressure Vapor Cycle Liquid Distillation is also incorporated herein by reference.

TECHNICAL FIELD

The present invention pertains to systems and methods for distributed utilities, and, more particularly, to providing distributed water purification systems using power and heat output from external combustion heat engines.

BACKGROUND ART

A dependable source of potable water eludes vast segments of humanity, the Canadian International Development Agency reporting that about 1.2 billion people lack access to safe drinking water. A person must depend, for a supply of clean water, on proximity to uncontaminated natural sources, or must otherwise have access to a dependable common system of publicly treated water, or else dependable supplies of chemical purifying agents or power sources for distillation, none of which are typically available in much of the developing world. Consequently, an integral and reliable source of treating water, whether for medical purposes, for human consumption, or otherwise, that is robust, efficient, and requires only readily available materials is very desirable. As used herein, and in any appended claims, the term 'purifying' refers to substantially reducing the concentration of one or more contaminants to specified levels or otherwise substantially altering the concentration of one or more substances to specified levels. The term 'specified levels' refers to some desired level of concentration, as established by a user for a particular application. One instance of a specified level may be limiting a contaminant level in a fluid to carry out an industrial or commercial process. An example is eliminating contaminant levels in solvents or reactants to a level acceptable to enable an industrially significant yield in a chemical reaction (e.g., polymerization). Another instance of a specified level may be a certain contaminant level in a fluid as set forth by a governmental or intergovernmental agency for safety or health reasons. Examples might include the concentration of one or more contaminants in water to be used for drinking or particular health or medical applications, the concentration levels being set forth by organizations such as the World Health Organization or the U.S. Environmental Protection Agency.

Distributed water purification systems, such as described in U.S. Provisional Application 60/425,820 and concurrently filed U.S. application Ser. No. 10/713,617, entitled "Pressure Vapor Cycle Liquid Distillation, and distributed electrical generators, such as diesel-powered internal combustion generators and generators based on the Stirling cycle, such as described in U.S. Pat. No. 6,253,550, may be used to provide electricity and safe drinking water without the expense and delays associated with building and maintaining utility plants and the infrastructure required to bring the electricity and safe drinking water and to its point of use. With the use of such distributed utilities, however, comes the need to appropriately distribute these utilities to the people who need them and to monitor the operation and correct usage of these systems.

SUMMARY OF THE INVENTION

In accordance with preferred embodiments of the present invention, there is provided a method for removing contaminants from water. The method has a first step of driving an electric generator by means of a thermal cycle engine for generating electrical power capacity, the thermal cycle engine including a burner for combusting a fuel. The method has further steps of employing at least a portion of the electrical power capacity of the electric generator for powering a water purification unit, supplying source water to an input of the water purification unit, and conveying heat output of the thermal cycle engine for supplying heat to the water purification unit. In a specific embodiment, the water purification unit can be a vapor compression distillation system. In such case the method may additionally have the steps of vaporizing the untreated water and condensing the vaporized water into a distilled water product.

In accordance with further embodiments of the invention, the step of conveying heat output may further include transferring heat from an exhaust gas of the burner to source water supplied to the water purification unit, and also heating an enclosure surrounding the water purification unit for reducing thermal losses.

In accordance with other embodiments of the invention, a method is provided for concentrating contaminants removed from water. The method has steps of:
  a. driving an electric generator by means of a thermal cycle engine for generating electrical power capacity, the thermal cycle engine including a burner for combusting a fuel;
  b. employing at least a portion of the electrical power capacity of the electric generator for powering a water purification unit;
  c. supplying source water to an input of the water purification unit;
  d. conveying heat output of the thermal cycle engine for supplying heat to the water purification unit;
  e. vaporizing the untreated water; and
  f. collecting contaminants removed from the water.

In accordance with yet further embodiments of the invention, a system is provided for purifying water that has a thermal cycle engine including a burner for combusting a fuel for driving an electric generator to generate electrical power capacity and a water purification unit powered by the electric generator. The system also has an input for receiving source water for purification by the water purification unit and a conduit for conveying heat output of the thermal cycle engine to the water purification. In a specific embodiment, the water purification unit can be a vapor compression distillation system.

In accordance with other embodiments of the present invention, a monitoring system for distributed utilities is provided. The monitoring system has a generation device for converting an available resource to a desired utility. The available resource may be water, in which case the generator is a purifier for providing potable water. Alternatively, the generator may convert a fuel to electrical power. In either case, an input sensor is provided for measuring one or more characteristics of the input to the generation device, while an output sensor is provided for measuring consumption or other characteristic of output from the generation device. The monitoring system has a controller for concatenating measured input and consumption of output on the basis of the input and output sensors.

Where the generation device is a water purifier, the input sensor may be a flowrate monitor. The output sensor may be a water quality sensor including one or more of turbidity, conductivity, and temperature sensors. On the other hand, where the generation device is an electrical power generator, the input sensor may include a fuel consumption rate monitor and the output sensor may include an electrical usage meter.

The monitoring system may also have a telemetry module for communicating measured input and output parameters to a remote site, either directly or via an intermediary device such as a satellite, and, moreover, the system may include a remote actuator for varying operating parameters of the generator based on remotely received instructions. The monitoring system may also have a self-locating device, such as a GPS receiver, having an output indicative of the location of the monitoring system. In that case, characteristics of the measured input and output may depend upon the location of the monitoring system.

In accordance with further embodiments of the invention, a distributed network of utilities is provided, including sources of purified water and sources of electrical power. The distributed network has generators for converting a resource into a useful utility, input sensors for measuring inputs to respective generators, output sensor for measuring consumption of output from respective generators, and a telemetry transmitter for transmitting input and output parameters of a specified generator. Finally, the distributed network has a remote processor for receiving input and output parameters from a plurality of utility generators.

In accordance with yet another embodiment of the invention, a method is provided for supplying distributed utilities. The method has steps of providing a generator to a user, monitoring at least one index of generator usage to supply a utility, and charging the user on the basis of the index of generator usage.

BRIEF DESCRIPTION OF THE DRAWINGS

The foregoing features of the invention will be more readily understood by reference to the following detailed description, taken with reference to the accompanying drawings, in which.

DETAILED DESCRIPTION OF THE INVENTION

Figure 1:
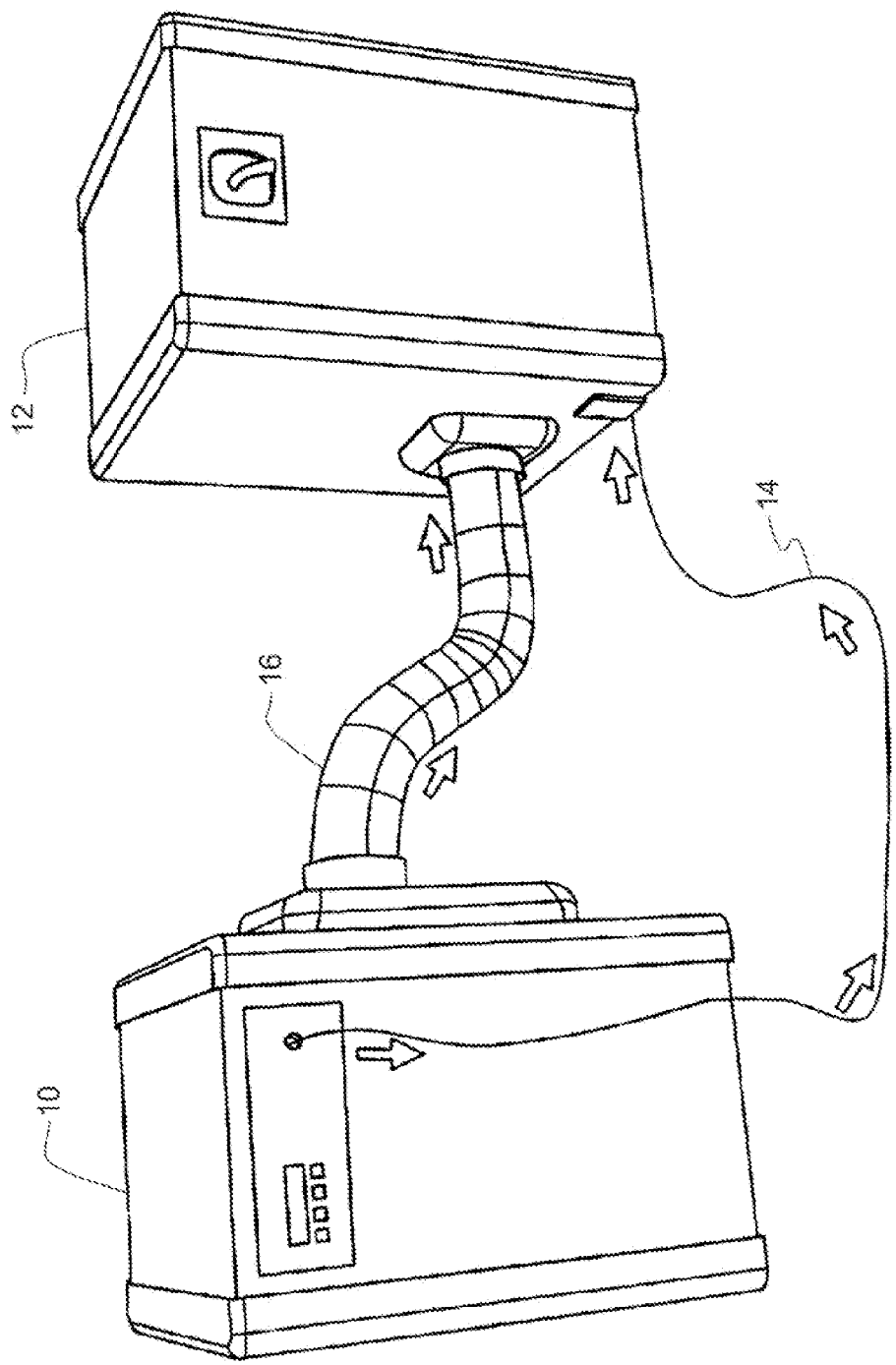
FIG. 1 shows the component power unit and water purifier unit in accordance with a preferred embodiment of the present invention.

The systems provided in accordance with embodiments of the present invention have two basic functional components that may be combined within a single integral unit or may be capable of separate operation and coupled as described herein for the purpose of local water purification. FIG. 1 depicts an embodiment of the invention in which a power unit 10 is coupled electrically, via cable 14, to provide electrical power to a vapor compression water distillation unit 12, with exhaust gas from the power unit coupled to convey heat to the water distillation unit via an exhaust duct 16.

Use of an external combustion engine, such as a Stirling cycle engine, to provide mechanical power for conversion into electrical power by means of a generator is described in detail in U.S. Pat. No. 6,536,207 (Kamen et al.), issued Mar. 25, 2003, and incorporated herein by reference.

Thermal cycle engines are limited, by second law of thermodynamics, to a fractional efficiency, i.e., a Carnot efficiency of $(T_H-T_C)/T_H$, where $T_H$ and $T_C$ are the temperatures of the available heat source and ambient thermal background, respectively.

During the compression phase of a heat engine cycle, heat must be exhausted from the system in a manner not entirely reversible, thus there will always be a surfeit of exhaust heat. More significantly, moreover, not all the heat provided during the expansion phase of the heat engine cycle is coupled into the working fluid. Here, too, exhaust heat is generated that may be used advantageously for other purposes. The total heat thermodynamically available (i.e., in gas hotter than the ambient environment) in the burner exhaust is typically on the order of 10% of the total input power. For a power unit delivering on the order of a kilowatt of electrical power, as much as 700 W of heat may be available in an exhaust stream of gas at temperatures in the vicinity of 200° C. In accordance with embodiments of the present invention, the exhaust heat, as well as the electrical power generated by an engine-powered generator, are used in the purification of water for human consumption, thereby advantageously providing an integrated system to which only raw water and a fuel need be provided.

Moreover, external combustion engines, such as Stirling cycle engines, are capable of providing high thermal efficiency and low emission of pollutants, when such methods are employed as efficient pumping of oxidant (typically, air, and, referred to herein and in any appended claims, without limitation, as "air") through the burner to provide combustion, and the recovery of hot exhaust leaving the heater head. In many applications, air is pre-heated, prior to combustion, nearly to the temperature of the heater head, so as to achieve the stated objectives of thermal efficiency. However, the high temperature of preheated air, desirable for achieving high thermal efficiency, complicates achieving low-emission goals by making it difficult to premix the fuel and air and by requiring large amounts of excess air in order to limit the flame temperature. Technology directed toward overcoming these difficulties in order to achieve efficient and low-emission operation of thermal engines is described, for example, in U.S. Pat. No. 6,062,023 (Kerwin, et al.) issued May 16, 2000, and incorporated herein by reference.

External combustion engines are, additionally, conducive to the use of a wide variety of fuels, including those most available under particular local circumstances, however the teachings of the present description are not limited to such engines, and internal combustion engines are also within the scope of the present invention. Internal combustion engines, however, impose difficulties due to the typically polluted nature of the exhausted gases, and external combustion engines are preferably employed.

Figure 2:
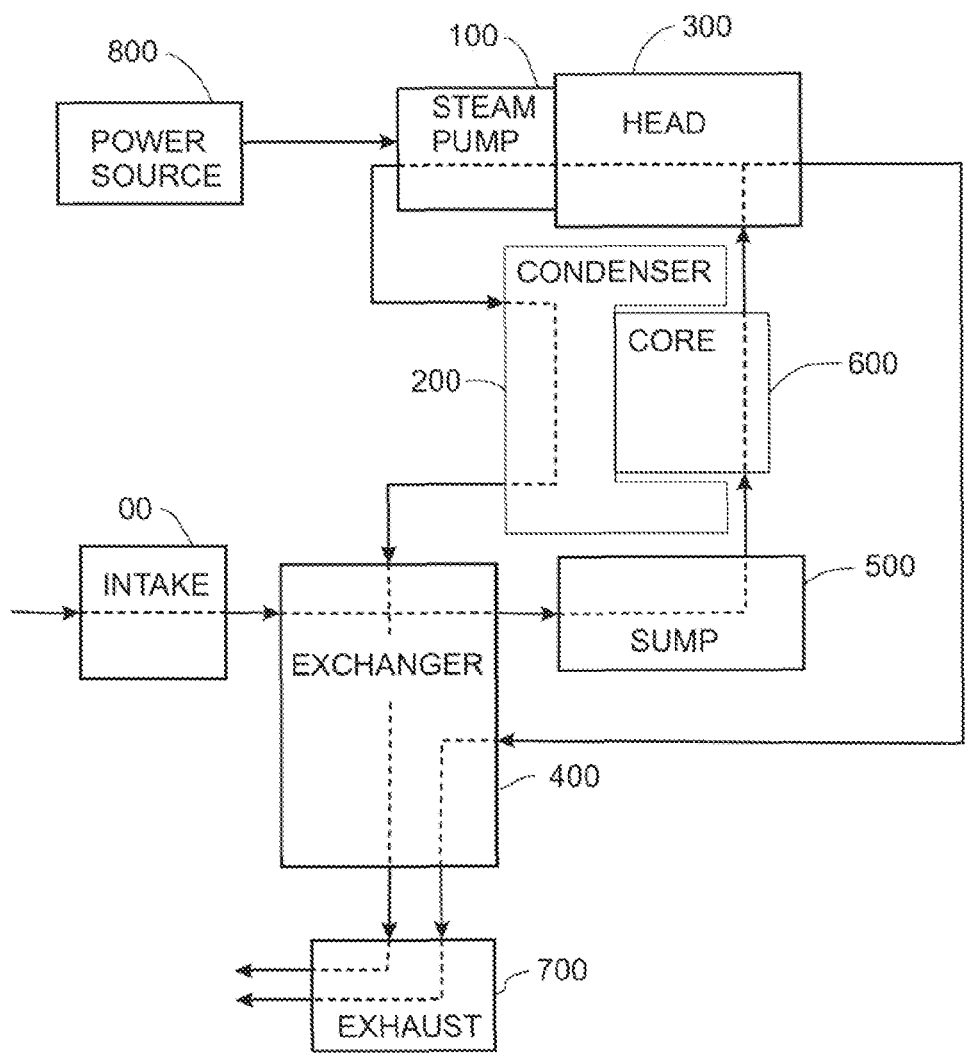
FIG. 2 is a basic block diagram of a vapor compression water purification unit in accordance with embodiments of the invention.

Within the scope of the present invention, water purification system 12 may be embodied in various ways. A conceptual flow diagram of a vapor compression distillation unit in accordance with one possible embodiment of the present invention is shown in FIG. 2, with liquid flow paths indicated by arrows. In an embodiment of this type, liquid flows through the system from an intake 00 into an exchanger 400 wherein exchanger 400 receives heat from at least one of a plurality of sources including a condenser 200, a head 300, and exhaust (not shown) from a power source such as an internal or external combustion engine. Liquid continues flowing past heat exchanger 400 into a sump 500 and into a core 600 in thermal contact with condenser 200. In the core 600, the liquid is partially vaporized. From core 600, the vapor path proceeds into head 300 in communication with a compressor 100, and from there into condenser 200. After vapor is condensed, liquid proceeds from condenser 200 through heat exchanger 400, and finally into an exhaust region 700 and then out as final distilled product.

Pre-treatment of the liquid to be distilled, typically water in the present application, occurs within intake 00. Pre-treatment operations may include any or all of gross-filtering, treatment with chemical additives such as polyphosphates or polyaspartates, electrochemical treatment such as with an oscillating magnetic field or an electrical current, degassing, or UV treatment. As mentioned above, in one particular embodiment, a Stirling engine generator which produces exhaust high in $CO_2$ content is used as the power source 800 to power the overall system. In such an embodiment, the exhaust from the Stirling engine may be funneled back to intake 00 and used to acidify the water to be purified as one means of pre-treatment. Such acidification may, for example, reduce any scaling that might otherwise occur in the system.

Figure 3:
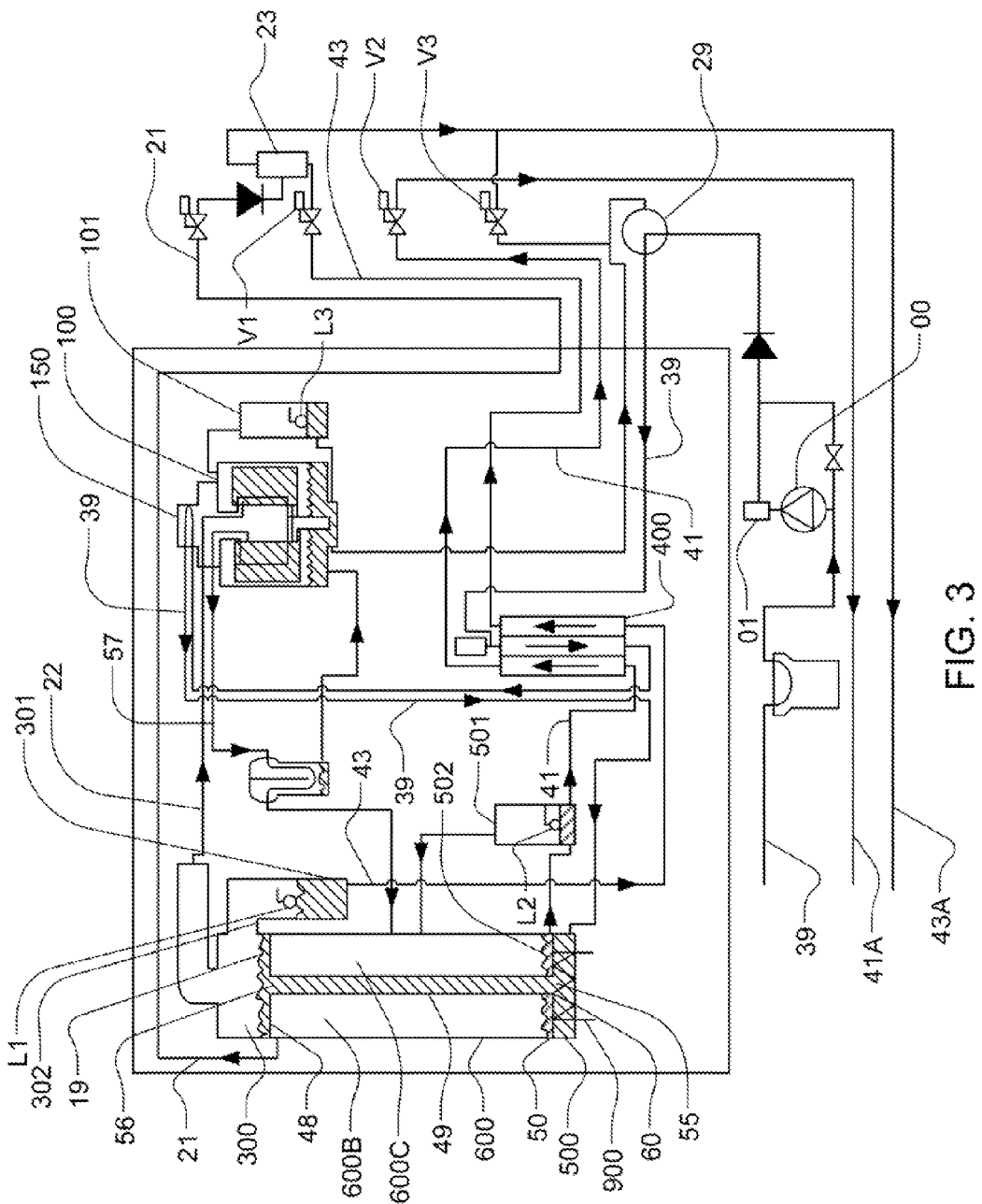
FIG. 3 is a schematic diagram of a water purification unit in accordance with embodiments of the invention.

One practical embodiment of the vapor compression still of FIG. 2 is shown in the schematic diagram of FIG. 3. A system in accordance with this particular embodiment, shown by way of example, has cold liquid intake 39 flowing through pump intake 00, continuing through exchanger 400. Pump 00 is typically a diaphragm positive-displacement pump, which is self-priming when the system is not pressurized—i.e., the pressure inside the system equals the pressure outside. In a preferred embodiment, pump 00 may also have a loop feedback configuration, with air vent 01, to help prime pump 00 upon start-up, or more particularly, to re-prime the operating system, under pressure, if the prime is lost, as would happen if the source hose were removed from the liquid source container.

From exchanger 400, the intake line may continue in a cooling loop about motor 150, and then continue into core evaporator/condenser 600 wherein condenser 200 has a top core plate 48 and a bottom core plate 50. Within core evaporator/condenser 600 may be multiple parallel tubes 49, typically made of copper-nickel alloy or other heat-transferable material, having head manifold openings 56 to allow core tubes 49 to communicate with head 300, and having sump manifold openings 55 to allow tubes 49 to communicate with sump 500. Steam 21 from the condenser section 600C of evaporator/exchanger 600 may also feed into a volatile mixer 23 where volatile gases may be released from the system.

The system maintains a constant blowdown water flow to prevent scaling in the system. Water level 19 in head chamber 300 is adjusted through a feedback control loop using level sensor L1, valve V1, and source pump 00, to maintain proper water flow through the blowdown stream 43. The three-way source pump fill valve 29 is set to pump water into sump 500, which causes water level 19 in head chamber 300 to rise. As liquid level 19 rises in head chamber 300, liquid overflows past a dam-like barrier 302 into blowdown control chamber 301 containing product level sensor L1. As required, blowdown valve V1 is controlled to allow water flow from blowdown control chamber 301 through heat exchanger 400, to extract heat and cool blowdown stream 43, and flow out valve V1, through volatile mixer 23 allowing cooling of hot gases and steam 21 from the condenser section 600C, and then completing the blowdown stream, out to waste 43A.

The system also maintains proper product flow. Product level 502 builds up in condenser chamber 600C, and enters into product control chamber 501, where product level sensor L2 is housed. Using a feedback control loop with level sensor L2 and valve V2, product stream 41 is controlled to flow from product control chamber 501 through heat exchanger 400, to extract heat and cool product stream 41, then through valve V2 and on out to complete the product stream as product water outlet 41A. Furthermore, the system also maintains a proper liquid ring pump water level. Liquid ring pump control chamber 101, which houses liquid ring pump level sensor L3 used to control the liquid ring pump level, is fluidly connected to liquid ring pump 100. Liquid ring pump 100 is connected to the three-way source fill valve 29, which is set when the liquid ring pump requires more water and it is also connected to the liquid ring pump drain valve V3, which opens when it is required to drain water from liquid ring pump 100 into blowdown stream 43.

As shown in FIG. 3, there is additionally a steam flow line 22 from head 300 to compressor 100, a steam outlet 57 for diverting steam to condenser 200, a hot product line 41 from condenser 200 leading through exchanger 400, which also allows for collection of hot purified condensed product in chamber 501 and a line (not shown) for diverting hot product to compressor 100 to allow adjustment of water level to keep it constant. There may also be a drain line (not shown), for when the system is shut down. Further, there may be a heater 900 with heating element 60 for heating cold liquid to boiling at start-up, and for maintaining sufficient heat during operation of the still to continuously convert liquid to steam. In one embodiment of the invention, the distillation system may operate at steady-state without thermal input from the heater 900 after system start up. Alternatively, a second heater (not shown) may be used to maintain sufficient heat during operation; the heater may run continuously, in a pulsed mode, or be controlled by a controller.

Figure 4:
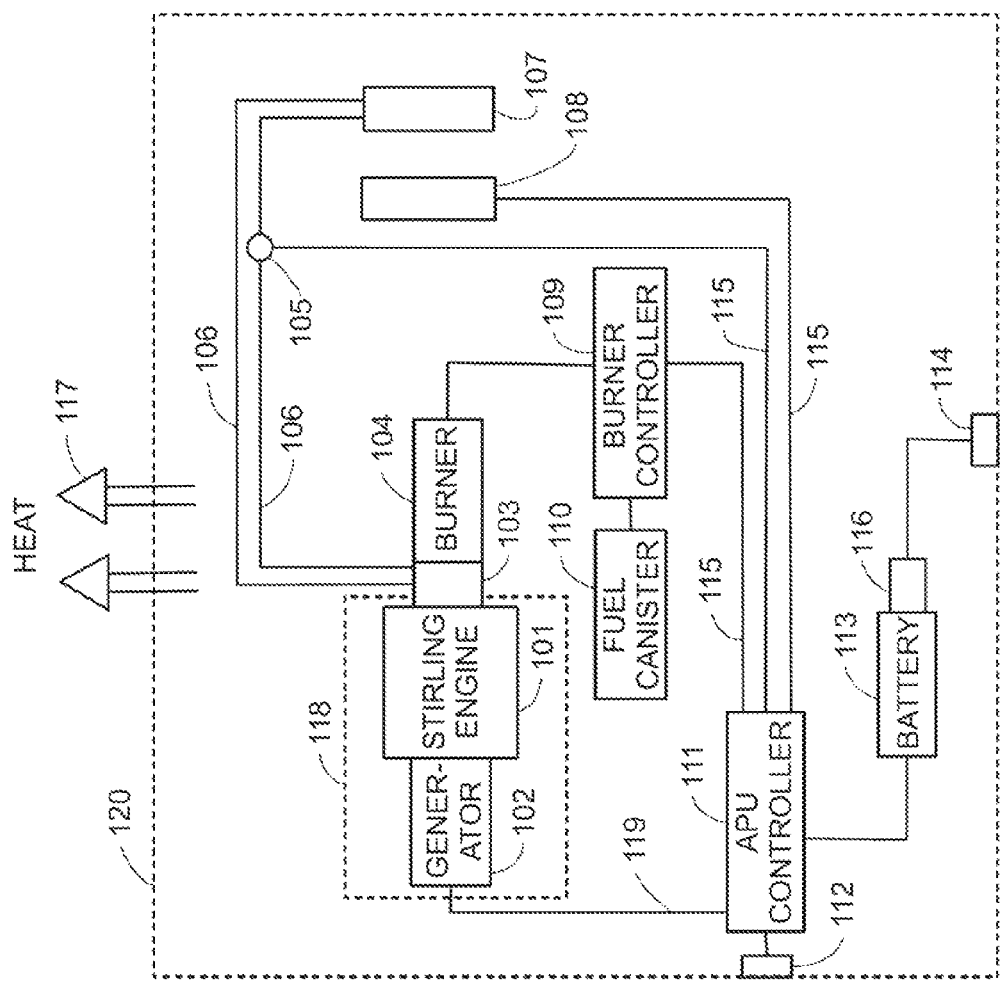
FIG. 4 is a schematic block diagram of an auxiliary power unit for providing electrical power and heat for water purification in accordance with the present invention.

An embodiment of a power unit 10 is shown schematically in FIG. 4. Power unit 10 includes an external combustion engine 101 coupled to a generator 102. In a preferred embodiment, the external combustion engine 101 is a Stirling cycle engine. The outputs of the Stirling cycle engine 101 during operation include both mechanical energy and residual heat energy. Heat produced in the combustion of a fuel in a burner 104 is applied as an input to the Stirling cycle engine 101, and partially converted to mechanical energy. The unconverted heat or thermal energy accounts for 65 to 85% of the energy released in the burner 104. This heat is available to provide heating to the local environment around power unit 10 in two forms: a smaller flow of exhaust gas from the burner 104 and a much larger flow of heat rejected at the cooler 103 of the Stirling engine. (Power unit 10 may also be referred to as an auxiliary power unit (APU).) The exhaust gases are relatively hot, typically 100 to 300° C., and represent 10 to 20% of the thermal energy produced by the Stirling engine 101. The cooler rejects 80 to 90% of the thermal energy at 10 to 20° C. above the ambient temperature. The heat is rejected to either a flow of water or, more typically, to the air via a radiator 107. Stirling cycle engine 101 is preferably of a size such that power unit 10 is transportable.

As shown in FIG. 4, Stirling engine 101 is powered directly by a heat source such as burner 104. Burner 104 combusts a fuel to produce hot exhaust gases which are used to drive the Stirling engine 101. A burner control unit 109 is coupled to the burner 104 and a fuel canister 110. Burner control unit 109 delivers a fuel from the fuel canister 110 to the burner 104. The burner controller 109 also delivers a measured amount of air to the burner 104 to advantageously ensure substantially complete combustion. The fuel combusted by burner 104 is preferably a clean burning and commercially available fuel such as propane. A clean burning fuel is a fuel that does not contain large amounts of contaminants, the most important being sulfur. Natural gas, ethane, propane, butane, ethanol, methanol and liquefied petroleum gas ("LPG") are all clean burning fuels when the contaminants are limited to a few percent. One example of a commercially available propane fuel is HD-5, an industry grade defined by the Society of Automotive Engineers and available from Bernzomatic. In accordance with an embodiment of the invention, and as discussed in more detail below, the Stirling engine 101 and burner 104 provide substantially complete combustion in order to provide high thermal efficiency as well as low emissions. The characteristics of high efficiency and low emissions may advantageously allow use of power unit 10 indoors.

Generator 102 is coupled to a crankshaft (not shown) of Stirling engine 101. It should be understood to one of ordinary skill in the art that the term generator encompasses the class of electric machines such as generators wherein mechanical energy is converted to electrical energy or motors wherein electrical energy is converted to mechanical energy. The generator 102 is preferably a permanent magnet brushless motor. A rechargeable battery 113 provides starting power for the power unit 10 as well as direct current ("DC") power to a DC power output 112. In a further embodiment, APU 10 also advantageously provides alternating current ("AC") power to an AC power output 114. An inverter 116 is coupled to the battery 113 in order to convert the DC power produced by battery 113 to AC power. In the embodiment shown in FIG. 1, the battery 113, inverter 116 and AC power output 114 are disposed within an enclosure 120.

Figure 5:
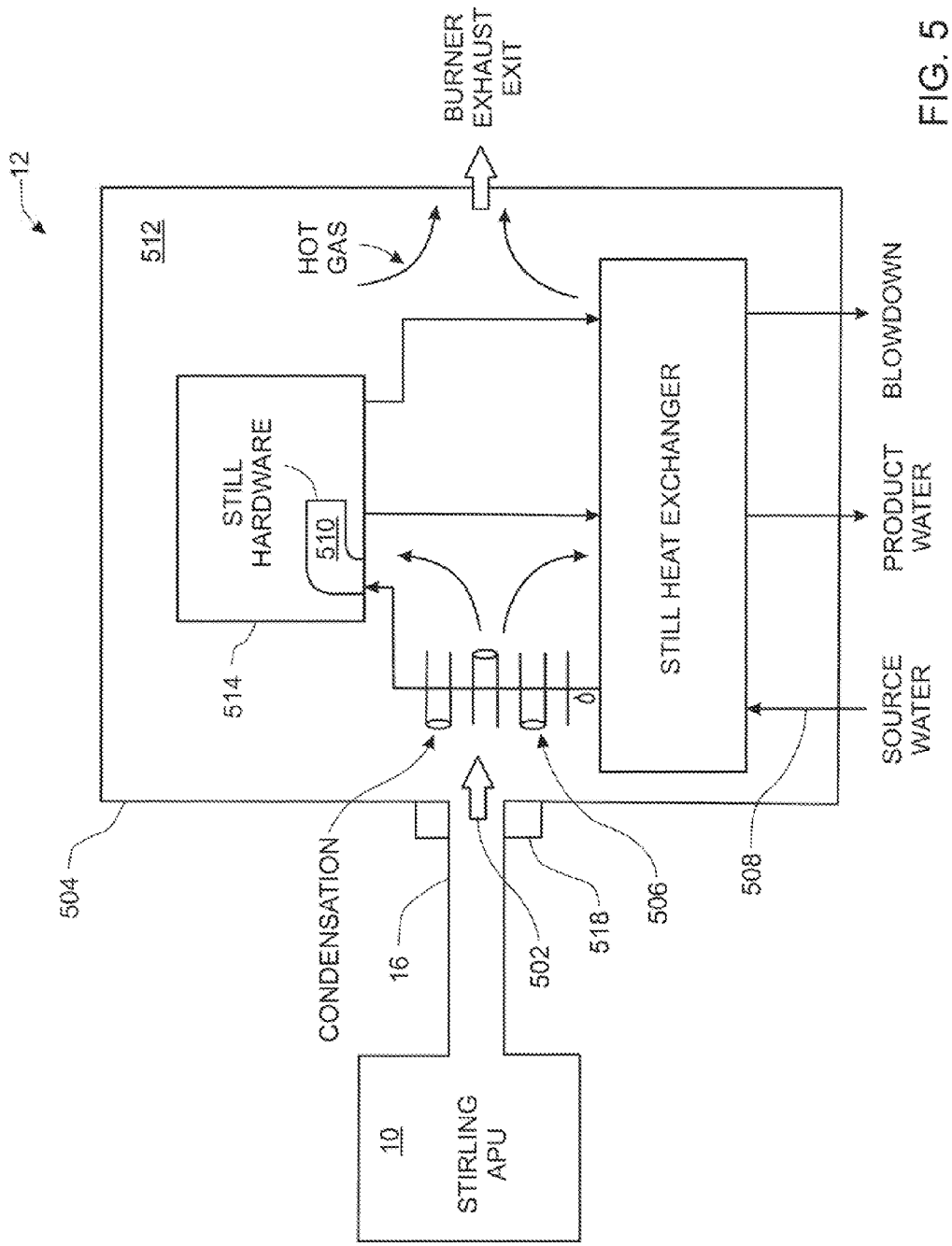
FIG. 5 is a schematic overview of an integral power unit/water purification system in accordance with an embodiment of the present invention.

Utilization of the hot exhaust gas generated in the operation of power unit 10 is now described with reference to the schematic depiction of an embodiment of the invention in FIG. 5. Burner exhaust is directed through a heat conduit 16 into enclosure 504 of water purification unit designated generally by numeral 12. Heat conduit 16 is preferably a hose that may be plastic or corrugated metal surrounded by insulation, however all means of conveying exhaust heat from power unit 10 to water purification unit 12 are within the scope of the present invention. The exhaust gas, designated by arrow 502, blows across finned heat exchanger 506, thereby heating the source water stream 508 as it travels to still evaporator 510. The hot gas 512 that fills the volume surrounded by insulated enclosure 504 essentially removes all thermal loss from the still system since the gas temperature within the insulated cavity is hotter than surface 514 of the still itself. Thus, there is substantially no heat flow from the still to the ambient environment, and losses on the order of 75 W for a still of 10 gallon/hour capacity are thereby recovered. A microswitch 518 senses the connection of hose 16 coupling hot exhaust to purification unit 12 so that operation of the unit may account for the influx of hot gas.

In accordance with alternate embodiments of the invention, adding heat to exhaust stream 502 is within the scope of the invention, whether through addition of a post-burner (not shown) or using electrical power for ohmic heating.

During initial startup of the system, power unit 10 is activated, immediately providing both electrical power and hot exhaust. Warm-up of water purification unit 12 is significantly accelerated since finned heat exchanger 506 is initially below the dew point of the moisture content of the exhaust and since the exhaust contains water as a primary burner combustion product. All the heat of vaporization of this water content is available to heat source water as the water condenses on the fins of the heat exchanger. The heat of vaporization supplements heating of the fins by convection of hot gas within the still cavity. Heating of the fins by convection continues even after the fins reach the dew point of the exhaust.

In accordance with other embodiments of the present invention, power unit 10 and water purification unit 12 may be further integrated by streaming water from the purification unit through the power unit for cooling purposes. The use of source water for cooling presents problems due to the untreated nature of the water. Whereas using the product water requires an added complexity of the system to allow for cooling of the power unit before the purification unit has warmed up to full operating conditions.

Figure 6:
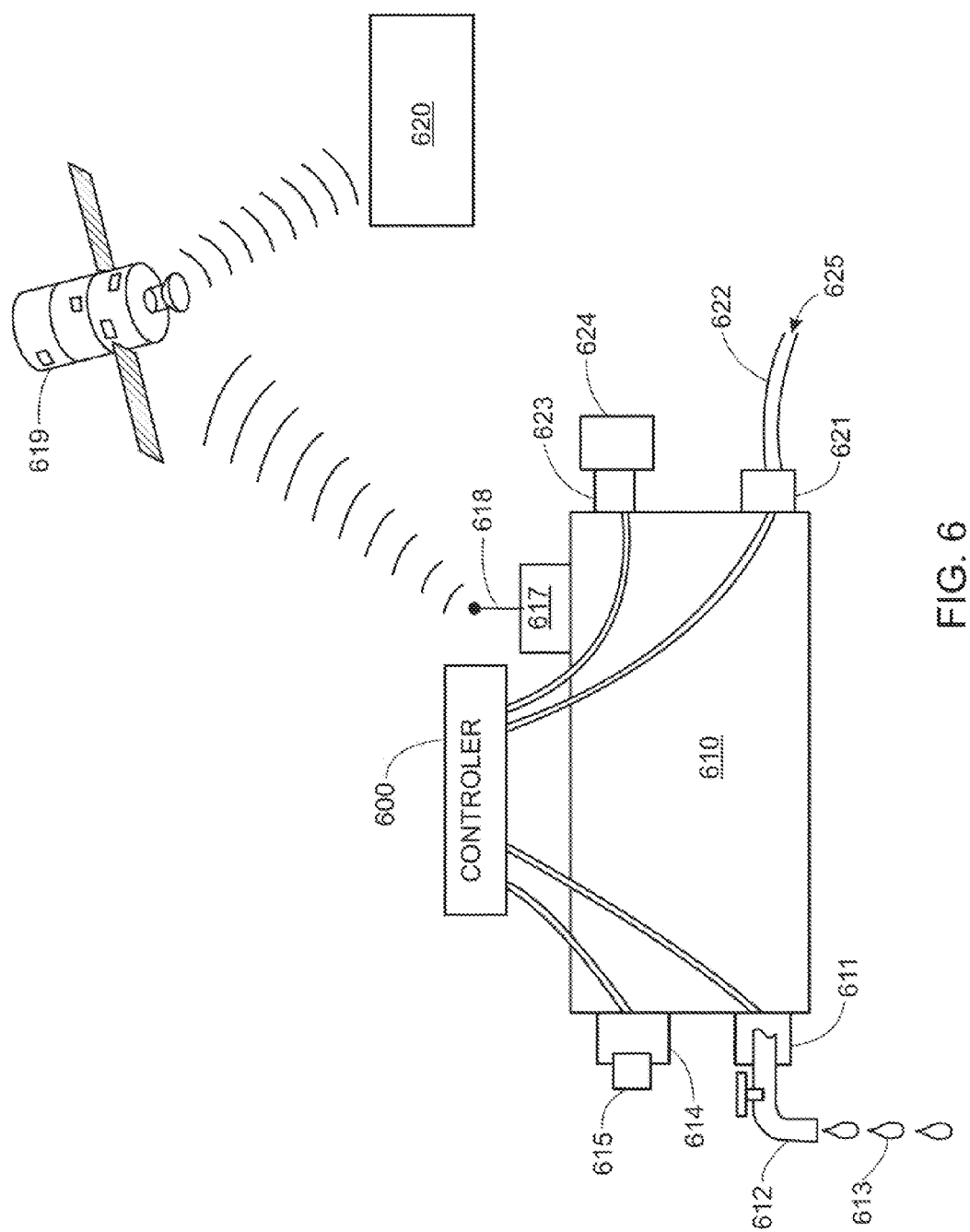
FIG. 6 is a depiction of a monitoring system for distributed utilities in accordance with embodiments of the present invention.

As now described with reference to FIG. 6, embodiments of the present invention provide for monitoring generation device 610. The term "generation device" is used here inclusively, and may be any distributed utility generation device, such as a water purification system, an electrical generator, or other utility generation device, or a combination of these, as described above.

In the case in which generation device 610 is a water purification device, source water enters the generation device 610 at inlet 622 and leaves the generation device at outlet 612. The amount of source water 625 entering generation device 610 and the amount of purified water 613 leaving generation device 610 can be monitored through the use of one or more of a variety of sensors commonly used to determine flow rate, such as sensors for determining the temperature and pressure or a rotometer, located at inlet sensor module 621 and/or at outlet sensor module 611, either on a per event or cumulative basis. Additionally, the proper functioning of the generation device 610 can be determined by measuring the turbidity, conductivity, and/or temperature at the outlet sensor module 611 and/or the inlet sensor module 621. Other parameters, such as system usage time or power consumption, either per event or cumulatively, can also be determined. When the location of the system is known, either through direct input of the system location or by the use of a GPS location detector, additional water quality tests may be run based on location, including checks for known local water contaminates, utilizing a variety of detectors, such as standard chemical tests, antibody chip detectors or cell-based detectors. Alternatively, selected water quality and/or quantity and flow rate tests can be run continuously or periodically, regardless of location. Further, scale build-up in the generation device 610, if any, can be determined by a variety of methods, including monitoring the heat transfer properties of the system or measuring the flow impedance. A variety of other sensors may be used to monitor a variety of other system parameters.

In the case in which generation device 610 is an electrical generator, either alone or in combination with a water purification device or other device, fuel enters the generation device from a tank, pipe, or other means through fuel inlet 624. The amount of fuel consumed by generation device 610 can be determined through the use of a fuel sensor 623, such as a flow sensor. Electricity generated, or in the case of a combined electrical generator and water purification device, excess electricity generated can be accessed through electricity outlet 615. The amount of electricity used, either per event of cumulatively, may be determined by outlet sensor module 614. A variety of other sensors may be used to monitor a variety of other system parameters.

In either of the cases described above, input sensor modules 621 and 623 as well as output sensor modules 611 and 614 may be coupled to a controller 600, electrically or otherwise, in order to process, concatenate, store, or communicate the output values of the respective sensor modules as now described in the following sections.

Communications

The sensors described above may be used to monitor and/or record the various parameters described above onboard the generation device 610, or in an alternative embodiment of the present invention, the generation device 610 may be equipped with a communication system 617, such as a cellular communication system. More particularly, communication system 617 may be an internal system used solely for communication between the generation device 610 and the monitoring station 620. In other embodiments of the invention, communication system 617 is a cellular communication system that includes a cellular telephone for general communication through a cellular satellite system 619. Communication system 617 may additionally include a GPS (Global Positioning System) locator.

Communication system 617 enables a variety of improvements to the generation device 610, by enabling communication with a monitoring station 20. For example, the monitoring station 620 may monitor the location of the generation device 610 to ensure that use in an intended location by an intended user. Additionally, the monitoring station 620 may monitor the amount of water and/or electricity produced, which may allow the calculation of usage charges. Additionally, the determination of the amount of water and/or electricity produced during a certain period or the cumulative hours of usage during a certain period, allows for the calculation of a preventative maintenance schedule or alternatively system shutdown based on certain parameters. If it is determined that a maintenance call is required, either by the calculation of usage or by the output of any of the sensors used to determine water quality, water quantity, and/or flow rate, the monitoring station 620 can arrange for a maintenance visit. When a GPS locator is used, monitoring station 620 can determine the precise location of the generation device 610 to better facilitate a maintenance visit. The monitoring station 620 can also determine which water quality or other tests and/or monitoring are most appropriate for the present location of the generation device 610. The communication system 617 can also be used to turn the generation device 610 on or off, to pre-heat the device prior to use, or to deactivate the system in the event the system is relocated without advance warning, such as in the event of theft.

This information can be advantageously monitored through the use of a web-based utility monitoring system, such as those produced by Teletrol Systems, Inc. of Bedford, N.H.

Distribution

Figure 7:
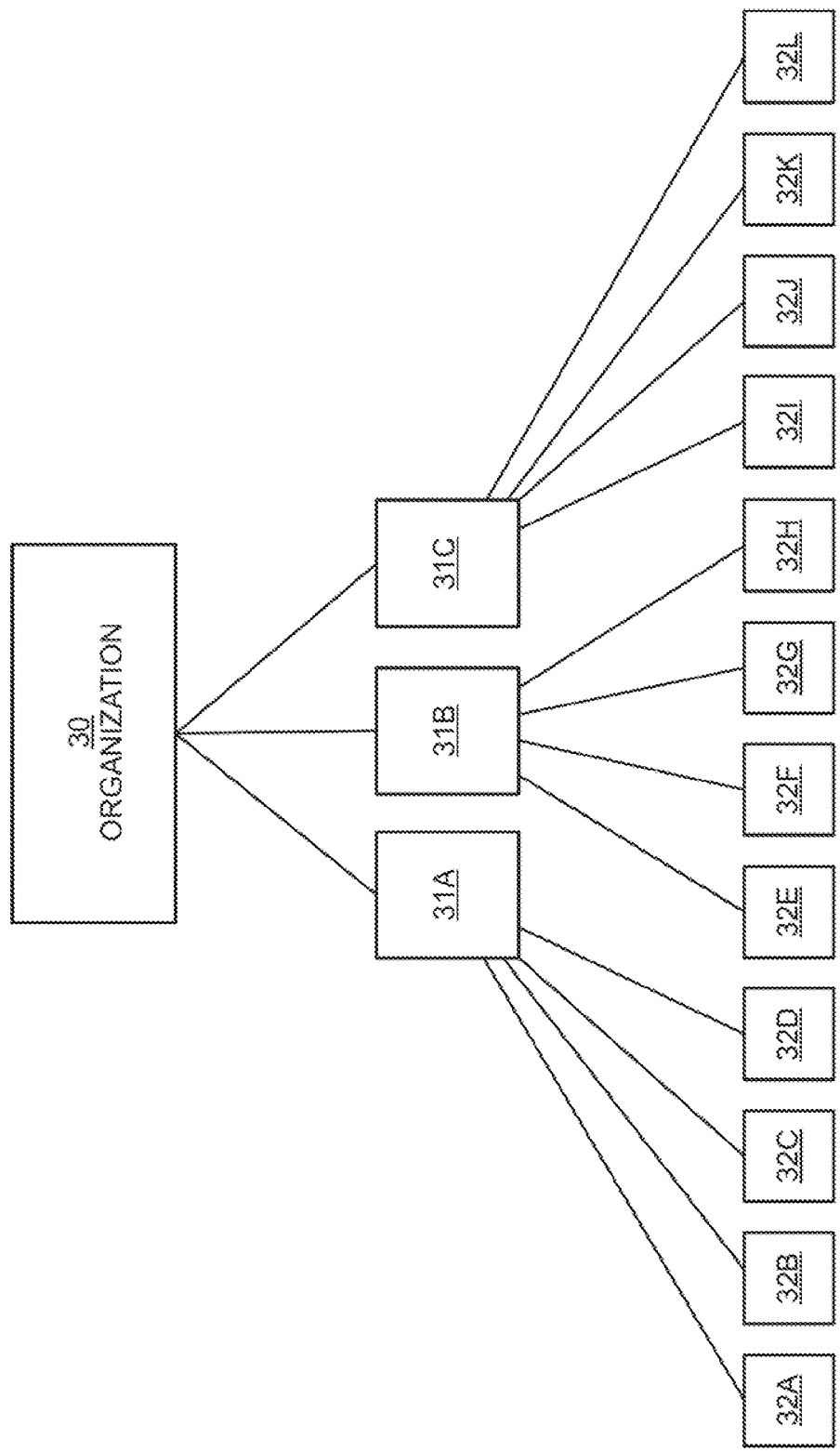
FIG. 7 is a depiction of a distribution system for utilities in accordance with embodiments of the present invention.

The use of the monitoring and communication system described above facilitates the use of a variety of utility distribution systems. For example, with reference to FIG. 7, an organization 30, such as a Government agency, non-governmental agency (NGO), or privately funded relief organization, a corporation, or a combination of these, could provide distributed utilities, such as safe drinking water or electricity, to a geographical or political area, such as an entire country. The organization 30 can then establish local distributors 31A, 31B, and 31C. These local distributors could preferably be a monitoring station 620 described above. In one possible arrangement, organization 30 could provide some number of generation devices 610 (shown in FIG. 6) to the local distributor 31A, etc. In another possible arrangement, the organization 30 could sell, loan, or make other financial arrangements for the distribution of the generation devices 610. The local distributor 31A, etc. could then either give these generation devices to operators 32A, 32 B, etc., or provide the generation devices 610 to the operators though some type of financial arrangement, such as a sale or micro-loan.

The operator 32A may provide distributed utilities to a village center, school, hospital, or other group at or near the point of water access. In one preferred embodiment, when the generation device 610 is provided to the operator 32A by means of a micro-loan, the operator 32A could charge the end users on a per-unit bases, such as per watt hour in the case of electricity or per liter in the case of purified water. Either the local distributor 31 or the organization 30 may monitor usage and other parameters using one of the communication systems described above. The distributor 31 or the organization 30 could then recoup some of the cost of the generation device 610 or effect repayment of the micro-loan by charging the operator 32 for some portion of the per-unit charges, such as 50%. The communication systems described additionally can be used to deactivate the generation device 610 if the generation device is relocated outside of a pre-set area or if payments are not made in a timely manner. This type of a distribution system may allow the distribution of needed utilities across a significant area quickly, while then allowing for at least the partial recoupment of funds, which, for example, could then be used to develop a similar system in another area.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A monitoring system for distributed utilities, the monitoring system comprising:
   a. at least one vapor compression water distillation unit wherein the at least one vapor compression water distillation unit converts available water to a output distilled water;
   b. an input sensor for measuring the amount of water input to the at least one vapor compression water distillation unit;
   c. an output sensor for measuring consumption of output distilled water from the at least one vapor compression water distillation unit by at least one end user; and d. a controller for concatenating measured water input and consumption of output distilled water on the basis of the input and output sensors.

2. A monitoring system according to claim 1, where the at least one vapor compression water distillation unit is driven by a Stirling cycle engine.

3. A monitoring system according to claim 1, wherein the input sensor is a flow sensor.

4. A monitoring system according to claim 1, wherein the output sensor measures power consumption.

5. A monitoring system according to claim 1, wherein the input sensor includes a fuel consumption rate monitor.

6. A monitoring system according to claim 1, further comprising a telemetry module for communicating measured input and output parameters to a remote site.

7. A monitoring system according to claim 1, further comprising a remote actuator for varying operating parameters of the at least one vapor compression water distillation unit based on remotely received instructions.

8. A monitoring system according to claim 1, further comprising a self-locating device having an output indicative of the location of the monitoring system.

9. A monitoring system according to claim 1, wherein monitored characteristics of input and output depend upon the location of the monitoring system.

10. A distributed network of utilities comprising:
 a. a plurality of vapor compression water distillation units driven by respective Stirling cycle engines for converting available water into distilled water;
 b. a plurality of input sensors for measuring the amount of water input to each vapor compression water distillation unit;
 c. a plurality of output sensors for measuring consumption of output from each vapor compression water distillation unit by at least one end user;
 d. a telemetry transmitter for transmitting input and output parameters of a specified vapor compression water distillation unit; and
 e. a remote processor for receiving input and output parameters from the plurality of vapor compression water distillation units.

11. A distributed network according to claim 10, wherein the plurality of input sensors are flow sensors.

12. A distributed network according to claim 11, wherein the plurality of input sensors include a fuel consumption rate monitor.

13. A distributed network according to claim 11, wherein the telemetry transmitter communicating measured input and output parameters to a remote site.

14. A distributed network according to claim 11, further comprising a remote actuator for varying operating parameters of the plurality of vapor compression water distillation units based on remotely received instructions.

15. A distributed network according to claim 11, further comprising a self-locating device having an output indicative of the location of the distributed network.

16. A distributed network according to claim 11, wherein monitored characteristics of input and output depend upon the location of the distributed network.

\* \* \* \* \*